United States Patent
Robinson et al.

(10) Patent No.: US 9,465,812 B1
(45) Date of Patent: Oct. 11, 2016

(54) SYSTEMS AND METHODS FOR MANAGEMENT OF INTERRED REMAINS

(71) Applicants: Dana bennet Robinson, la jolla, CA (US); Tristan Alexander Robinson, Portland, OR (US)

(72) Inventors: Dana bennet Robinson, la jolla, CA (US); Tristan Alexander Robinson, Portland, OR (US)

(*) Notice: Subject to any disclaimer, the term of this patent is extended or adjusted under 35 U.S.C. 154(b) by 0 days.

(21) Appl. No.: 15/007,270

(22) Filed: Jan. 27, 2016

Related U.S. Application Data

(63) Continuation-in-part of application No. 14/662,997, filed on Mar. 19, 2015, now Pat. No. 9,261,598.

(51) Int. Cl.
*G01S 19/14* (2010.01)
*G01S 19/00* (2010.01)
*G06F 17/30* (2006.01)
*H04L 29/06* (2006.01)
*H04W 4/02* (2009.01)

(52) U.S. Cl.
CPC ... *G06F 17/30241* (2013.01); *G06F 17/30041* (2013.01); *G06F 17/3087* (2013.01); *H04L 63/08* (2013.01); *H04W 4/021* (2013.01)

(58) Field of Classification Search
CPC .............................. G01S 13/878; G01S 19/14
USPC ................... 342/357.2, 357.25, 357.52, 386; 27/22.1, 29
See application file for complete search history.

(56) References Cited

U.S. PATENT DOCUMENTS

| | | | |
|---|---|---|---|
| 2006/0053604 A1* | 3/2006 | Brine | G06Q 50/10 27/1 |
| 2011/0115877 A1* | 5/2011 | Kang | H04N 7/147 348/14.12 |
| 2011/0161254 A1* | 6/2011 | Van Den Bogart | E04H 13/003 705/500 |
| 2014/0218519 A1* | 8/2014 | Borovinov | A61G 99/00 348/143 |

* cited by examiner

*Primary Examiner* — Dao Phan
(74) *Attorney, Agent, or Firm* — Baumgartner Patent Law; Marc Baumgartner

(57) ABSTRACT

Systems and methods for managing interred remains including using a physical location of the remains and a computer database are disclosed. The systems and methods relate to interacting with the interment site of the remains of a person or animal, including virtual gravestones, memorials consisting of audio and/or visual data, and ways to interact with such data by survivors.

19 Claims, 10 Drawing Sheets

Standard Locator

Augmented Reality

SYSTEMS AND METHODS FOR MANAGEMENT OF INTERRED REMAINS

CROSS-REFERENCE TO RELATED APPLICATIONS

The present invention claims priority and is a continuation-in-part to U.S. Ser. No. 14/662,997, filed Mar. 19, 2015, entitled SYSTEMS AND METHODS FOR MANAGEMENT OF INTERRED REMAINS, which is hereby incorporated by reference herein in its entirety.

BACKGROUND

The present disclosure relates generally to the interment of human or animal remains. In particular, systems and methods for managing remains including virtual graveyard with virtual gravestones marking geolocated plots on a parcel of land and a database for storing information related to the deceased.

Today, cemeteries and mortuaries are typically complex enterprises that combine a variety of physical assets. Cemeteries require large tracts of land and specialized improvements that are prepared for occupancy in advance of need. They generally require investment in specific inventory, which may take decades to market and absorb.

With traditional burial methods, a dead body is placed in a casket and the casket is buried in the ground of a cemetery. An entire industry revolves around traditional interment, including mortuaries where bodies are preserved and displayed for memorial services, where coffins are sold, and where cemetery plots are sold. A conventional cemetery is typically a unique piece of real estate where remains are interred, generally in perpetuity. A gravestone is usually purchased to place as a marker where the remains are buried. A fee is typically charged for the service and maintenance of the burial plot.

A cemetery, however, is not a typical real estate investment. The land is dedicated to the purpose of interment forever, laws regulate the cemetery business, trusts and endowments are used to pay for the maintenance of the cemetery. A land owner would be remiss to think that a cemetery would be a highest and best use of a plot of real estate in virtually any state in the United States. Some state laws even prohibit profiting on cemetery land.

Until fairly recently, most modern Western consumers have viewed the burial of a body in a cemetery, typically within a coffin, as the most proper means of interment. However, as consumer beliefs have changed, and cremation has become more and more acceptable. Cremation is the process of reducing human or animal remains to ashes. In this state, there is no prohibition against the possession and disposition of the cremated remains, or "cremains."

Cremains have often been held in a sealed "urn" which is kept by family members of the deceased, or by the owner of a pet that has been cremated. In other cases, ashes are scattered at sea, or taken by a family and scattered in a place desired by the deceased or the family. Some parks are considered "scattering ground" where it is acceptable to simply scatter all or part of cremains, which then become part of the soil and are neutrally integrated into the surroundings. In still other cases, cremains are put into a columbarium, or a permanent memorial device at a cemetery or other location. Columbaria are often walls where cremains are deposited and a small plaque placed on the wall of "drawers" or other storage units. The columbarium is more efficient in that it allows the remains of many more deceased to be placed in a smaller space, and can be built tall or even subterranean.

Once the cremated remains are possessed by the deceased's loved ones, the remains may be disposed of in virtually any way. Usually, a family is faced with only a few options: keep the cremains; permanently inter the cremains and incur the costs of perpetual interment; or dispose of the cremains. Many families do not desire to keep cremains, yet they do not wish to incur the cost of permanent interment. Others are uncomfortable with the ethereal nature of scattering at sea or in a forest.

It is desirable therefore to provide something less ephemeral than the scattering of ashes in the ocean or on the ground, and yet less permanent than the use of a grave or columbarium. Furthermore, it is desirable to provide a sophisticated yet simple and elegant solution that gives "place" to the interment of cremains, yet does so in a way that is free of the burden of cemetery laws, and perpetual maintenance.

As more people desire to inter cremains in physical places, there is a need to use modern technology to create a means of identifying the place where cremains are interred, and to create a virtual and/or augmented reality to interact with the physical place. Traditionally, remains buried in a cemetery would be marked with a tombstone or footstone. However when cremains are interred outside of a cemetery, there may be no physical marker or evidence.

In addition, a traditional cemetery might offer a plot that is unmarked, and thus leave the remains without physical location for marking and revisiting the place of interment. The cemetery may do so for non-cremation burials in order to provide a space with grass or other landscape that is unimpeded by obstacles. Or, a cemetery may create unmarked space for cremains.

In both cases, a system is necessary to create a means of identifying the place of interment, and also for interacting with the data associated with the deceased. A digital gravestone can mark the spot. A digital memorial can call up messages from the deceased, or an obituary left by the family of the deceased. A collection of such interactive gravestones and memorials can create a virtual graveyard where there are no physical markers, whether in an existing cemetery, or on land not otherwise designated as a cemetery. A digital system for managing the location of the remains offers more than a mere GPS location, it offers the capacity for the deceased to leave his or her own messages and for the loved ones to create a virtual gravestone that is more than a marker; they can leave a memorial and a tribute. In addition, users who visit the site can not only view the tribute to the deceased, but also interact, post messages and share memories. A visitor can even leave virtual flowers or other digital information that others might view when they visit the site in person or visit the decedent's profile from a remote location.

SUMMARY

The interment management systems and methods described herein provide solutions to many of these issues. As disclosed herein, systems and methods for managing interred remains are described.

In some embodiments, there might be a parcel of land where multiple cremated remains are interred, such as on a grassy hill overlooking the sea. The parcel of land might have been designated by the owner as a location for cremation remains to be scattered or buried. The parcel would have no evidence of its role as a burial site. However, a computer database electronically stores the geographic positions and the occupancy status of said plots.

In other embodiments, the inventive subject matter contemplates methods of creating virtual headstones that are chosen by the deceased before death, or by family after death, bearing the name and personal information of the deceased. The database may store an image of a gravestone bearing such information that is displayed to those who visit the plot. The deceased or family can include photos, video, and messages from or about the deceased that are displayed to plot visitors through their mobile computing devices.

This Summary is submitted with the understanding that it is not be used to interpret or limit the scope or meaning of the claims. Further, the Summary is not intended to identify key features or essential features of the claimed subject matter, nor is it intended to be used as an aid in determining the scope of the claimed subject matter.

DETAILED DESCRIPTION

Figure 2:
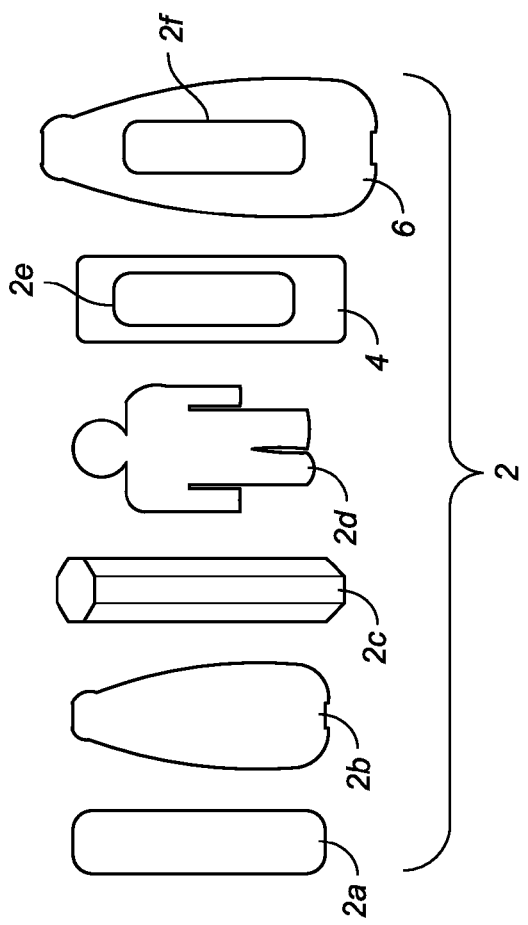
FIG. 2 is a simplified front view of examples of different cremains formed into different shapes or held in raw ash form inside another container.
Figure 1:
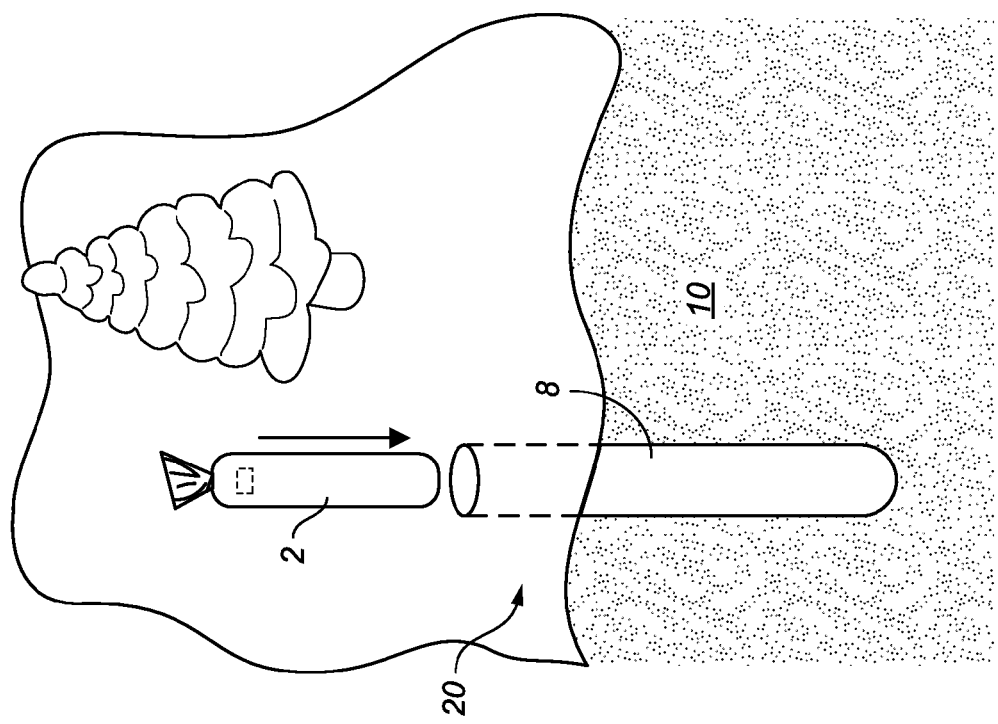
FIG. 1 is a simplified cross-sectional perspective view of a parcel of land with a geolocated plot and an interment of cremated remains of a deceased subject.
Figure 3:
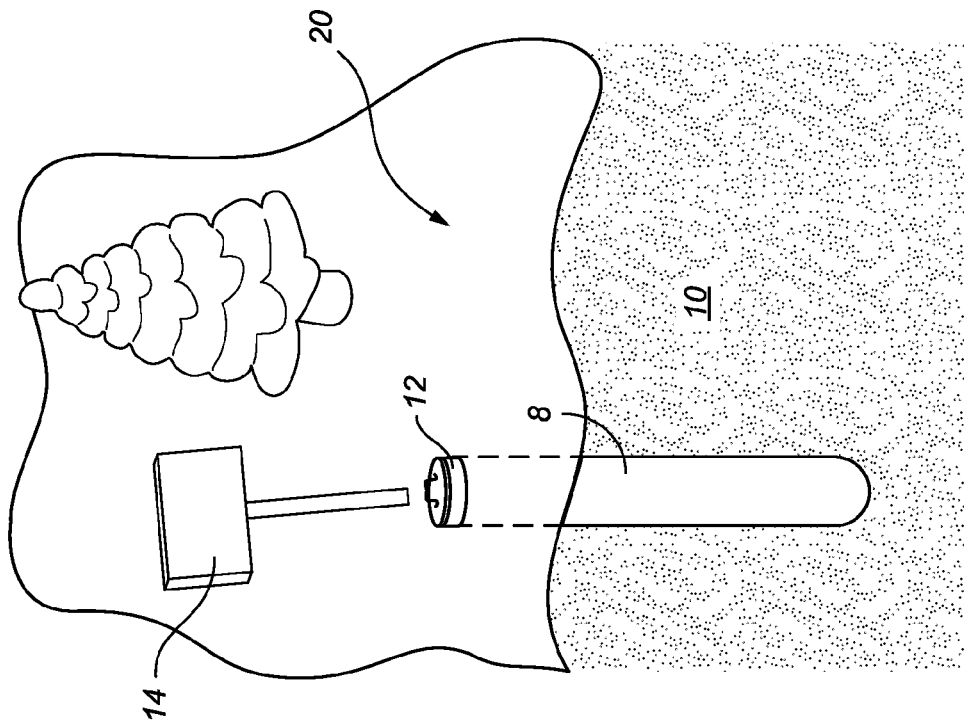
FIGS. 3 and 4 are simplified cross-sectional perspective views of a parcel of land showing details of accessories used in preparing a plot.
Figure 4:
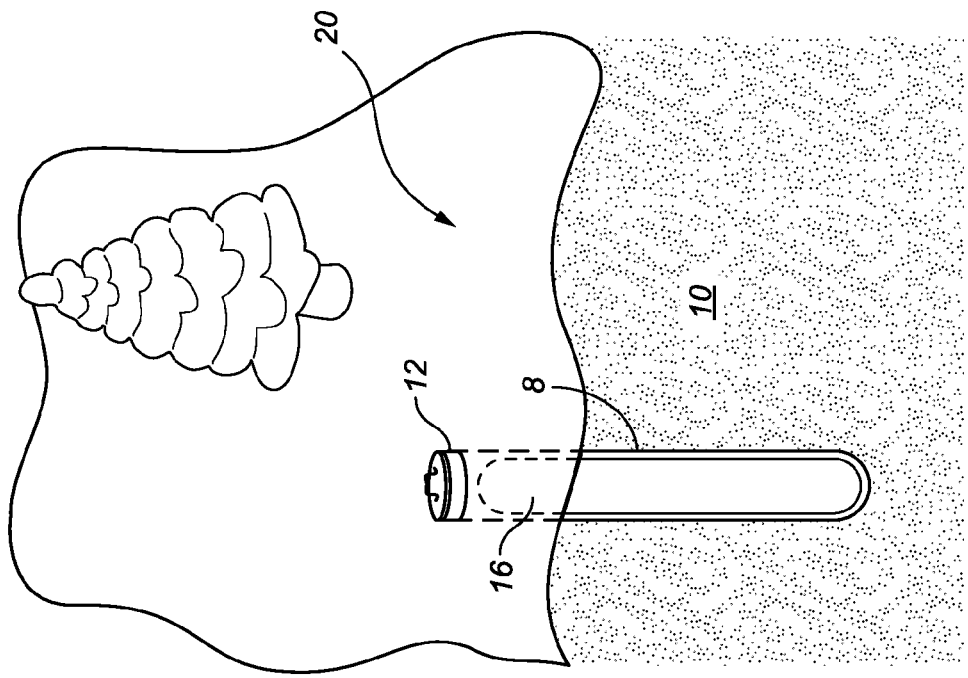
Figure 5:
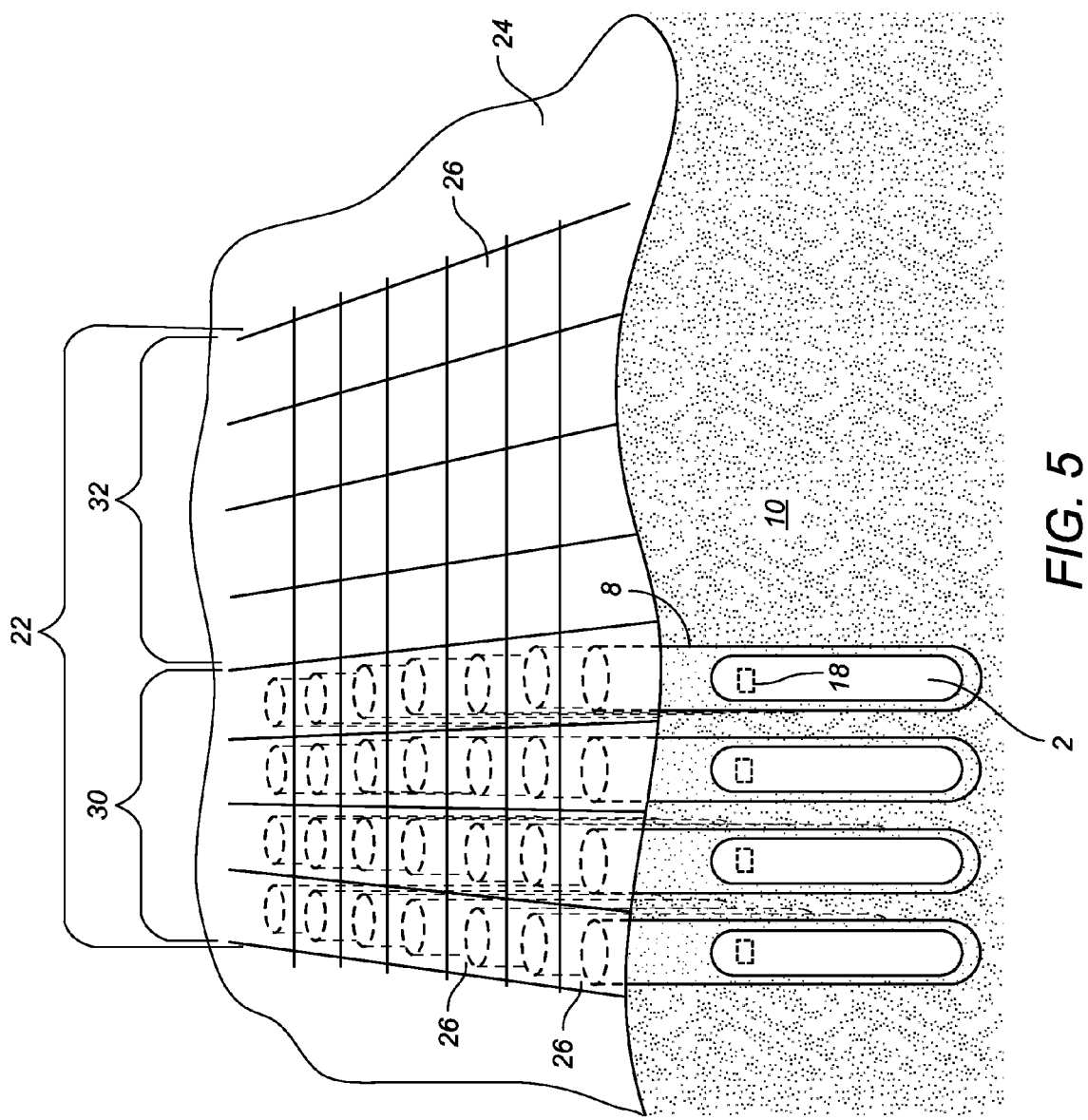
FIG. 5 is a simplified cross-sectional perspective view of a layout of a parcel of land with individual plots according to the inventive subject matter.

The disclosed systems and methods will become better understood through review of the following detailed description in conjunction with the figures. The detailed description and figures provide merely examples of the various inventions described herein. Those skilled in the art will understand that the disclosed examples may be varied, modified, and altered without departing from the scope of the inventions described herein. Many variations are contemplated for different applications and design considerations; however, for the sake of brevity, each and every contemplated variation is not individually described in the following detailed description.

Representative embodiments according to the inventive subject matter are shown in FIGS. 1-13, wherein the same or generally similar features share common reference numerals.

As used herein, the term "cremains" refers to cremated remains of a human or an animal. The term "remains" means remains of a human or animal, whether cremated or not cremated. A "plot" refers to a space dedicated to the interment of remains, or a space dedicated to interment or scattering of cremains. A "parcel" refers to an area of land used for interment of remains, or a space dedicated to interment or scattering of cremains. A parcel may contain multiple plots.

The inventive subject matter is directed to systems for managing a plurality of interred remains and includes a computer database. In one embodiment, the parcel of land includes a plurality of plots of land, each of these plots being geolocatable. The computer database electronically stores the geographic positions and the occupancy status of the plots.

The inventive subject matter is also directed to methods of managing interred remains of deceased subjects such that the subjects' location is ascertainable to those who wish to visit the plot. Rather than visiting a cemetery full of grave stones and footstones marking the place of interment, the inventive subject matter envisions a virtual graveyard with virtual gravestones, and a database that allows the user to find a plot, view a gravestone, read memorials and information, and even receive specific messages from the deceased when the visitor arrives at the plot. The visitor might also submit messages intended to be for the deceased that are put into the database, and either made readable by others, or not readable by anyone other than the one who submits the message(s). The visitor might leave virtual flowers, or a message that others can see who visit the site later and can know that the earlier visitor came and left virtual flowers.

In some embodiments, a radio frequency identification (RFID) device is added to the remains. The remains and a RFID device can be contained in a waterproof container interred within the geolocated plot. This could be as simple as a plastic bag, or as complex as a mini-coffin that is made of biodegradable materials. It can also be a means of forming the cremated remains into a semi-hard mass that can be transported and deposited in the ground without falling apart or blowing away as raw ash might. FIG. 2 shows ashen remains, for example cremains 2e and 2f, that are put into a waterproof container 4 or a biodegradable capsule such as a ceramic urn 6.

People may find the plot by visiting a website and getting a general "feel" from the map as to where the plot is located. They may also use a communication device such as a mobile or handheld device which would leverage GPS and/or RFID to "zero" in on the plot location.

Information about the deceased and the plot may be stored in a computer database or server and a user may send or received such information over a network. Access to the stored information may be restricted to a group or to individual(s).

In some embodiments, information regarding the first and second deceased subjects includes communications provided by the first and second deceased subjects prior to their death, and wherein the communications can be made available to a population of people after the subject's death. For example, a decedent may have chosen a plot before death, and created messages that would only be viewed by specific people, or on or after a specific date. A father may leave a heartfelt message for his wayward son in the event that the son visits his interment plot. That son may also be able to send a private message to the database that is intended for his deceased father, saying what he wants without others viewing it later, or he may wish to leave a message that he visited his father that others are allowed to view when they visit the site. In addition, the father may wish to leave messages that his wayward son can read even if the son does not visit his physical plot. The inventive subject matter anticipates a user being able to interact with the virtual gravestone without visiting the location, and using a computer to access the data and enjoying the same capacity to interact with the data from a remote location as one would who visits the plot's physical location.

Computer database 60 is configured to be accessed through a client communication device, such as mobile electronic device 50, which can be a GPS enabled device allowing a mobile electronic device user to geolocate the geolocated plot. To assist with locating a plot, a controlling party or administrator of computer database 60 can provide to parcel owners a selection of items including software to store the geolocation and the occupancy status of the plots, access to the computer database to store geolocation and occupancy status of the plots, means for geolocating designated plots, and means for interacting with the audio and/or visual data related to the deceased interred at such plots. Such audio visual data may include, but is not limited to: text, digital images, digital video, voice recordings, music, 3D images, 3D video, words, characters, emojis, art, and holograms.

Geolocating a plot of interest may be done with several purposes. For example, locating the plot for the purpose of selecting or selling the plot (this is achieved using geolocation but the consumer might make a plot selection on a map or on the website), locating for purpose of preparing plot for burial of cremains (for example a plot digger must find the correct plot location before digging hole and preparing for the day of burial), using mobile application or phone or by using a special-purpose device provided by the administrator, and locating by family of the deceased for the purpose of burial or later visitation. Also, a user at a remote computer may use the geolocation in order to find the location on a map, and even use map software such as Google Earth to view the location from satellite images.

Mobile device 50 has a mobile application which verifies the location of a visitor 52 that is using mobile device 50. In some embodiments, verification of the location of remains can be accomplished via a space-based navigation system, such as via a satellite 54, and a GPS location that is recorded for the plot of the deceased. Additionally or alternatively, location of remains may be accomplished by interaction between a handheld communication device, for example a mobile application on mobile device 50 and a buried RFID device 18.

Figure 8A:
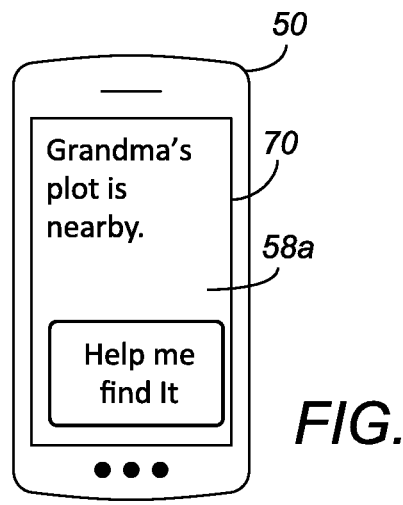
FIGS. 8A-D show several schematic top views of a communication device illustrating steps for locating a plot and using an application on a mobile device.
Figure 8B:
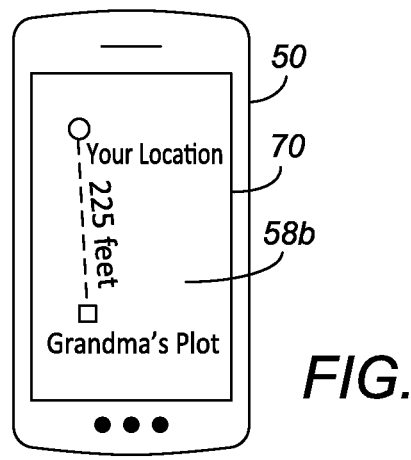
Figure 8C:
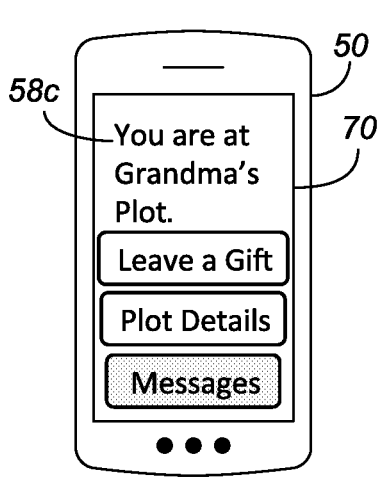
Figure 8D:
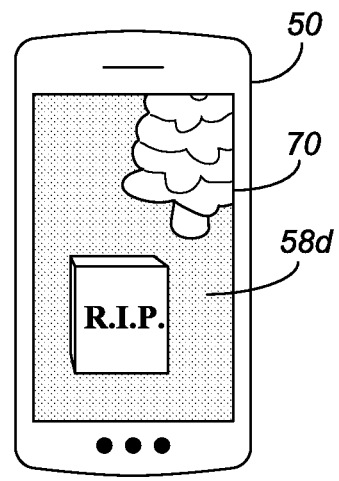

FIGS. 8A-D show a sequence of possible displays 58a-d on a user interface 70 of a mobile device 50, as they appear when a visitor is locating a plot. In this embodiment, the visitor has already been or authorized or registered with the administrator so that the plot to be visited is associated with the visitor. When approaching the site, the mobile application can be activated and the mobile application will be aware that the plot is nearby. As shown in FIG. 8A, mobile device 50 can show a display screen 58a including a query such as "Help me find it" eliciting execution of the mobile application. If the user opens the mobile application, they will see that there is a plot nearby which is associated with them, for example as shown on display screen 58b. The user can enlist the help of the device 50 to find the plot more specifically. The application on mobile device 50 can indicate distance to the plot and show a map including the location of the plot and the location of the visitor, as shown in FIG. 8B.

As the user approaches the plot, mobile device 50 shows more detailed information of the physical location of the plot, which might include viewing a digital display of a gravestone or other marker that appears on the computing device, and such display may function as "augmented reality" where the user views his surroundings through the camera viewer of a computing device and the viewer also shows audio and/or visual data on the same viewer. If the plot includes an RFID tag, then the GPS location may be used to bring the user into close proximity of the plot and the RFID will be used to verify that location and fine-tune the user so the location may be found with more precision. When the visitor is at the plot location, a screen, such as display screen 58c in FIG. 8C, can appear. The screen can include a selection of additional action items such as "Leave a Gift," "Plot Details," "Messages," and the like. If the deceased chose an augmented reality plot, the visitor may switch to a "live" view which will show the plot, for example a live camera view, and any virtual items associated with it, such as shown on display screen 58d in FIG. 8D.

Figure 7:
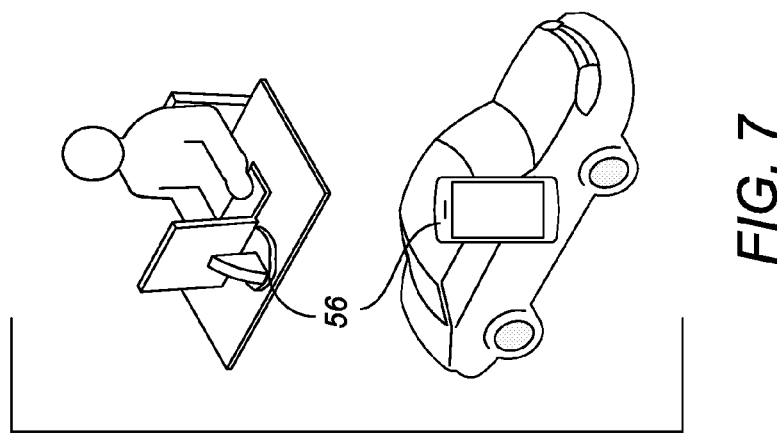
FIG. 7 is a schematic view illustrating options for remote access to unlocked information.
Figure 6:
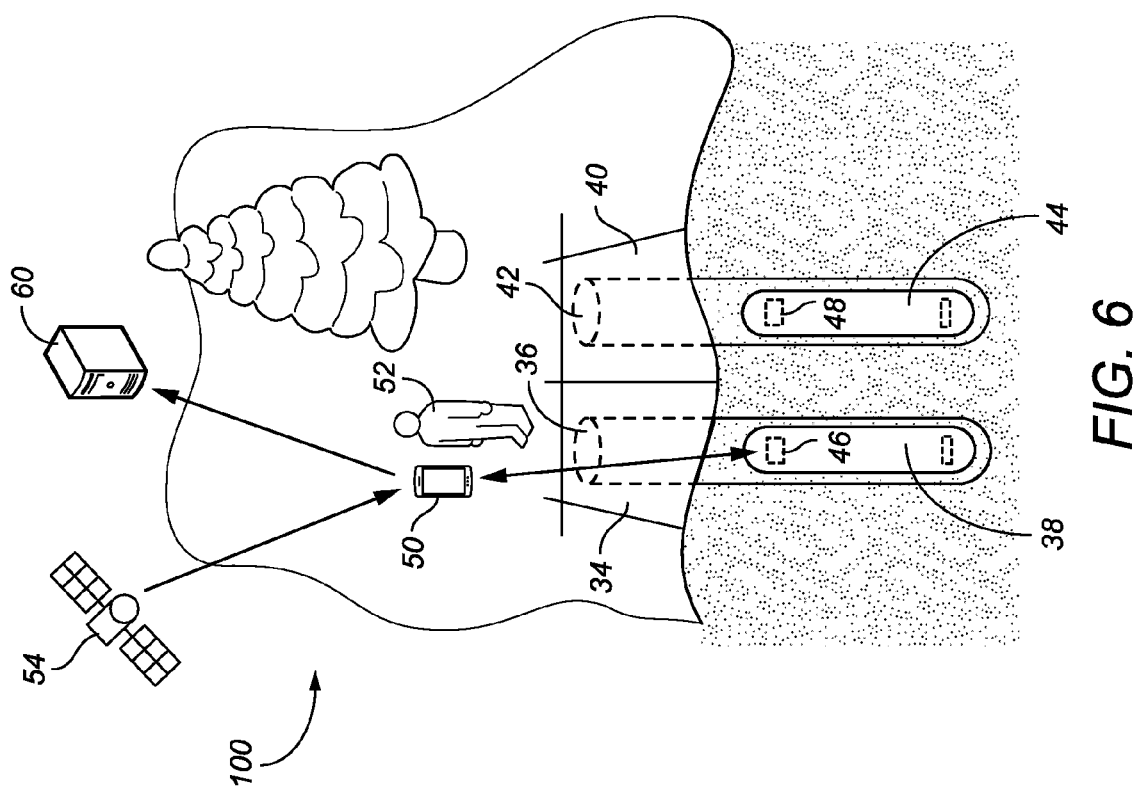
FIG. 6 is a simplified cross-sectional perspective view of a plot according to the inventive subject matter and illustrating a geolocation verification and location process of the plot.

In some embodiments, a mobile application records a valid "visit" of the burial site. A server may check for any newly available content based on preset parameters, for example current date, number of visits, current location, date of previous visits, or visits by other users, and unlock new information as appropriate. Once a visitor is away from the site, unlocked information may be accessible from a mobile device 50 or other computers 56, including mobile applications, as shown in FIG. 7. In some cases, the deceased or family may have chosen to make certain content available only on-site, and not available off-site.

Figure 11:
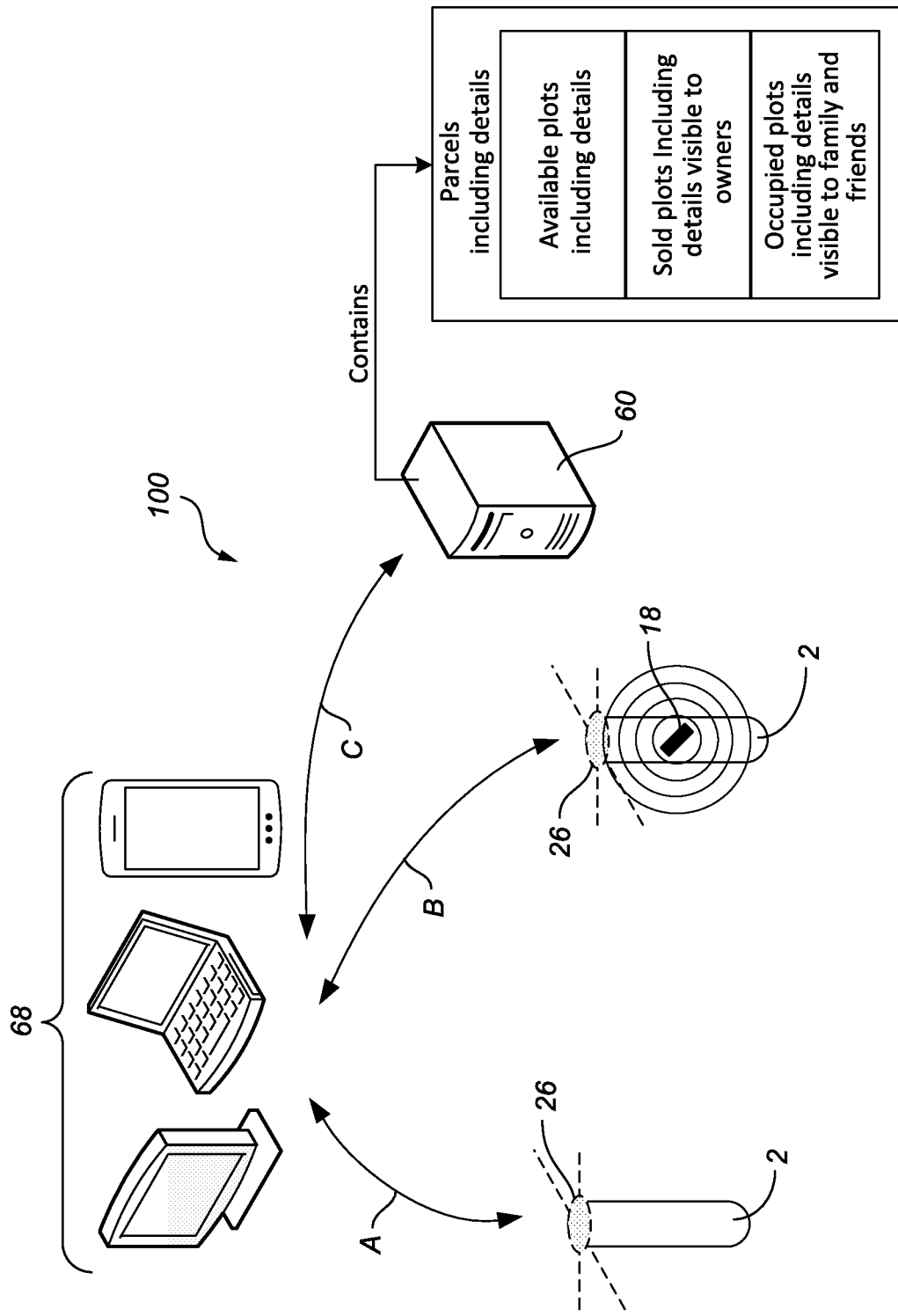
FIG. 11 is schematic illustrating different devices, systems, and methods as used with the inventive subject matter.

Examples of elements of a system for interment of cremation remains are shown in FIG. 11. A client communication device 68 can be used for transmitting and receiving location data over a network or via other communication channels. For example, a client communication device can be a mobile device such as a PDA, laptop, smartphone, tablet, netbook, and/or other mobile computing device, or a stationary device such as a desktop computer.

A dedicated application on the communication device may use a variety of different types of embedded or dedicated systems in which positioning subsystems are used. Generally, the client communication device has a processor to receive location data identifying the plot. For example, plot 26 may be identified via GPS location data provided to client communication device 68 via an appropriate communication channel, as illustrated with double-sided arrow A. In other embodiments, RFID device 18 provides location data to one or more of client communication devices 68, as illustrated with double-sided arrow B.

Where GPS is used for location, client communication device 68 receives a GPS signal and records a visit at or near the plot. Where a RFID tag is used, for example RFID device 18, the RFID tag emits a signal that is picked up by a communication device, for example via a RFID reader. The information can be communicated over the internet or other suitable communication means to the burial site administrator's computer database such as server 60. Double-sided arrow C illustrates communication between one or more of client communication devices 68 and administrator's server 60. Server 60 stores information related to the parcels, and includes information about the available plots, sold plots, and occupied plots.

Figure 12:
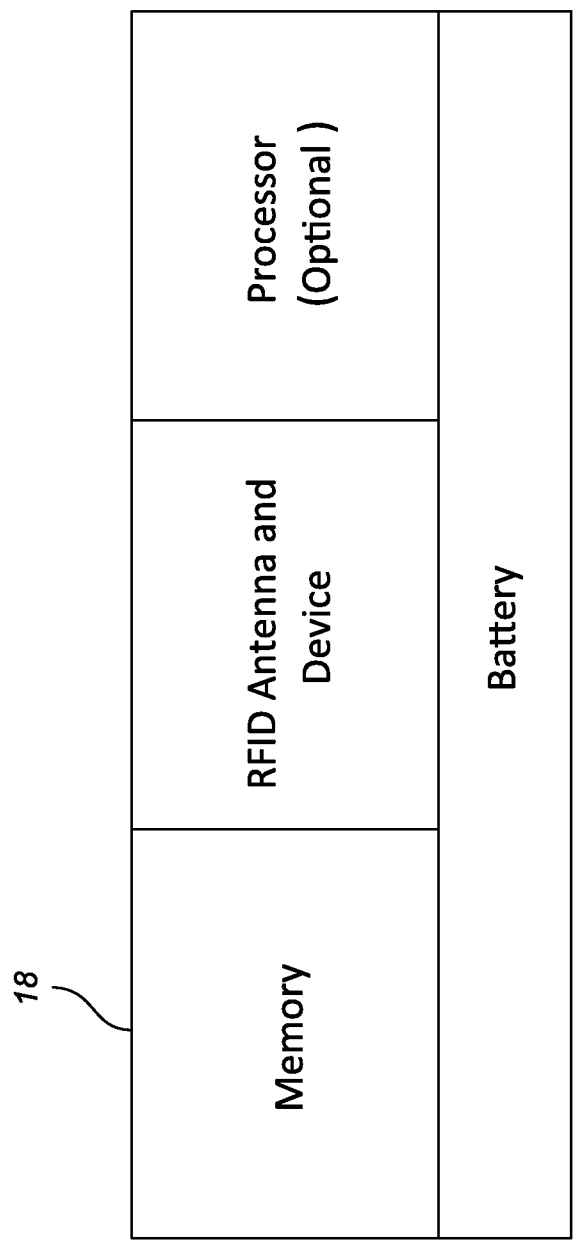
FIG. 12 is a schematic of architecture of a radio frequency identification device.

FIG. 12 shows an example of architecture of a suitable RFID device, such as RFID device 18, that can be buried with the remains. Here, RFID device 18 consists of a memory for data storage, an RFID antenna to facilitate communication, and an optional processor. RFID device 18 further has a battery to transmit a signal to a reader antenna. The RFID device 18 can be configured to emit signals at predefined intervals or transmit only when addressed by a reader. It is understood that some embodiments may include passive RFID devices or other suitable locator devices as known in the art.

Communication with the Deceased

Some embodiments of the inventive subject matter include a type of communication that allows the loved ones of the deceased to continue to communicate with the deceased. This can be accomplished through normal communication channels such as email, SMS (text messaging), or a messaging function within the burial administrator website and/or mobile application. The acquaintance may send a message to their loved one. These messages can be stored, for example in computer servers and, depending on the preferences selected, may be visible to others, visible to the sender, or may be impermanent.

Optionally, a response message may be sent on behalf of the deceased. In cases where pre-need arrangements have been made, the deceased might have arranged written or recorded messages in response to messages. The logic for these responses might be very simple, for example "Thank you for your message." Or the logic may be very complex, for example "if Larry has not visited in more than one year then respond with X. If he has visited respond with a random selection from the following messages P, Q, R."

Additionally, if the consumer has chosen the option, a wireless memory device may be included with the ashes or remains themselves at the time of burial. If someone visits the site in person, then certain messages from that user or from all users could be downloaded over wireless frequency to the memory device buried with the remains. This can be a short-term window of communication, perhaps a few years depending on battery life of the memory device buried with the remains, but this "direct" communication of private messages could be soothing to grieving family.

In addition to the possibility of this technological communication with the deceased, the deceased (in the case of a pre-need arrangement) may set up "locked" content that will only be available under certain conditions. For example, a certain video message from Grandma might only be available after five visits to the site of the plot. Or perhaps the locked message is available regardless of plot visitation, but only after 10 years have elapsed.

In some embodiments, technology can be used to allow the deceased to leave messages that play only upon certain events or dates. An example in one instance is that a deceased leaves a message for their children to appear only when they visit the plot. The RFID communicates with their mobile computer device, which interacts with servers to send stored messages to the user left by the deceased, for example a message such as "I love you. Do not be troubled" can be sent to the visitor.

In some cases, a computing device can be used within the plot to deploy messages in a similar way. The device can wirelessly transmit messages triggered by the arrival of a party with a mobile application that is able to read the wireless signals from the plot and provide messages to the user above ground. Software can be programmed with options by the deceased or the family, possibly asking who the visitor is, and then once identified, providing a unique message to that user, for example a humorous decedent might say, "Well, I'm surprised to see you here!" It is understood that video, audio, and images can also be stored and played in the same way.

Virtual Grave with Optional Augmented Reality

Figure 9:
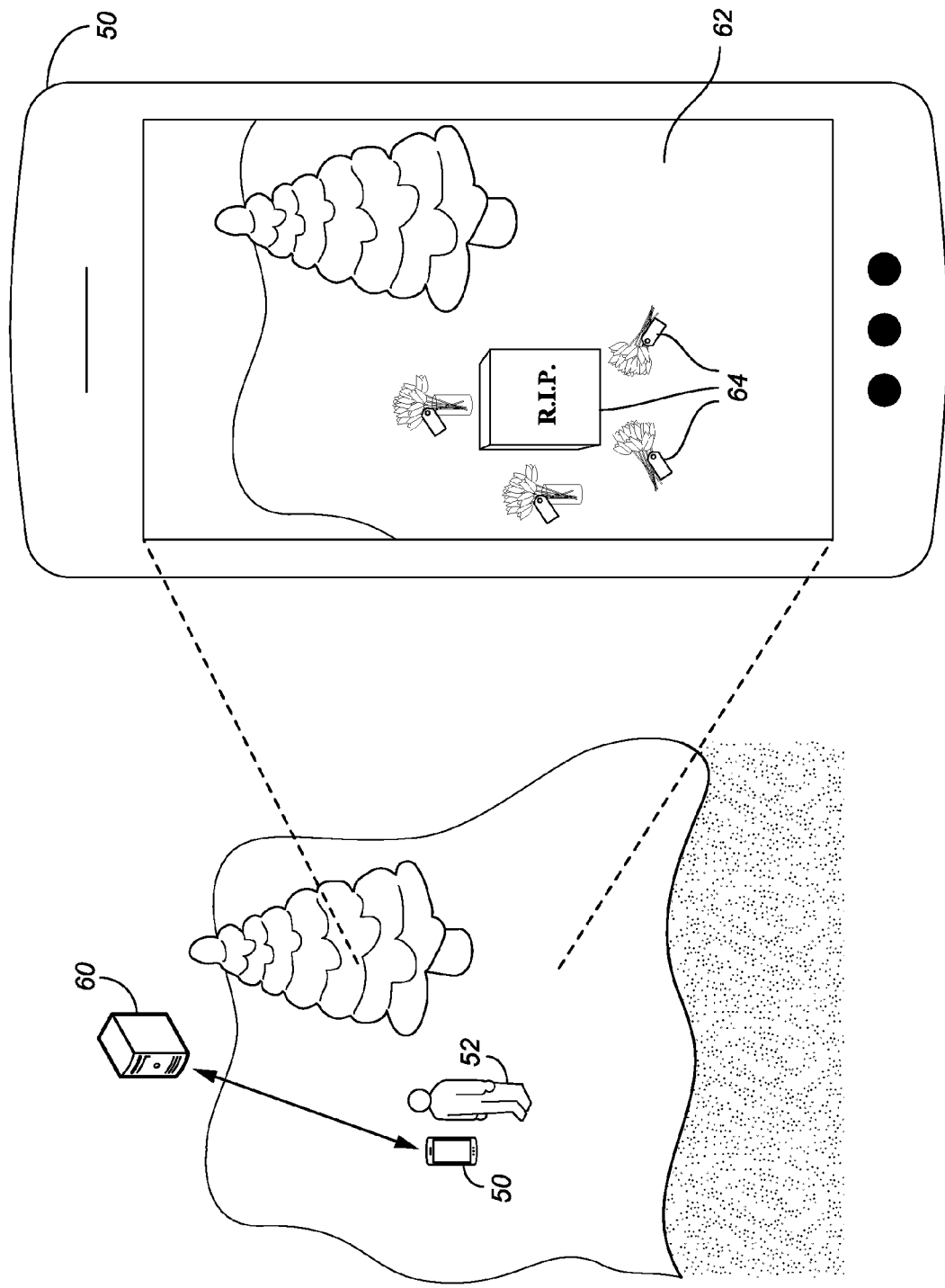
FIG. 9 is a simplified cross-sectional perspective view of a plot and an enlarged top view of a mobile device illustrating a virtual gravestone and accessories.

In some embodiments, the plot can be indistinguishable from the surroundings without technology to locate the plot. FIG. 9 shows a plot that is unmarked at the surface and indistinguishable from its surroundings. Through geolocation, a plot can be linked to data on a server 60 of the burial site administrator, or if an RFID tag is present the tag may activate a mobile application. Information about how the virtual plot should appear on mobile device 50 can be accessed either through connection to the server or was previously stored on the mobile device in the mobile application.

Mobile device 50 displays an augmented reality view 62, meaning that a visitor sees a "live" image of the real surroundings, for example through a camera in the mobile device. Additionally, other virtual items 64 may be seen such as a grave marker, gifts, and messages left by visitors of the deceased. The display of audio and/or visual information as an overlay with the actual view of the surroundings through a computing device's camera viewer gives the user a sense of "reality" that is "augmented" by the digital overlay of audio and/or visual data. Thus, a viewer can see a grassy space that is real, and also a digital gravestone generated by the computing device and displayed in the viewer where the plot is located.

In some embodiments, a variety of virtual objects may be included in a displayed view of the plot site. Examples of virtual objects may include pictures of a gravestone or other marker, photos or other images, video imagery, gifts or donations left by visitors to the plot or by others via a visit to the website or to a specific application, mementos or markers left by visitors, and the like.

The virtual grave may include any manner of grave marker of any size. Photos or videos of the deceased could be included at or around the plot. This could all be visible through an "augmented reality" view on the mobile device or on a website. Records of people's visits could be left in the virtual three-dimensional space. Visitors can use or purchase items from the administrator's website or mobile application to leave at the grave. Subsequent visitors can see the items left by other visitors.

Figure 10:
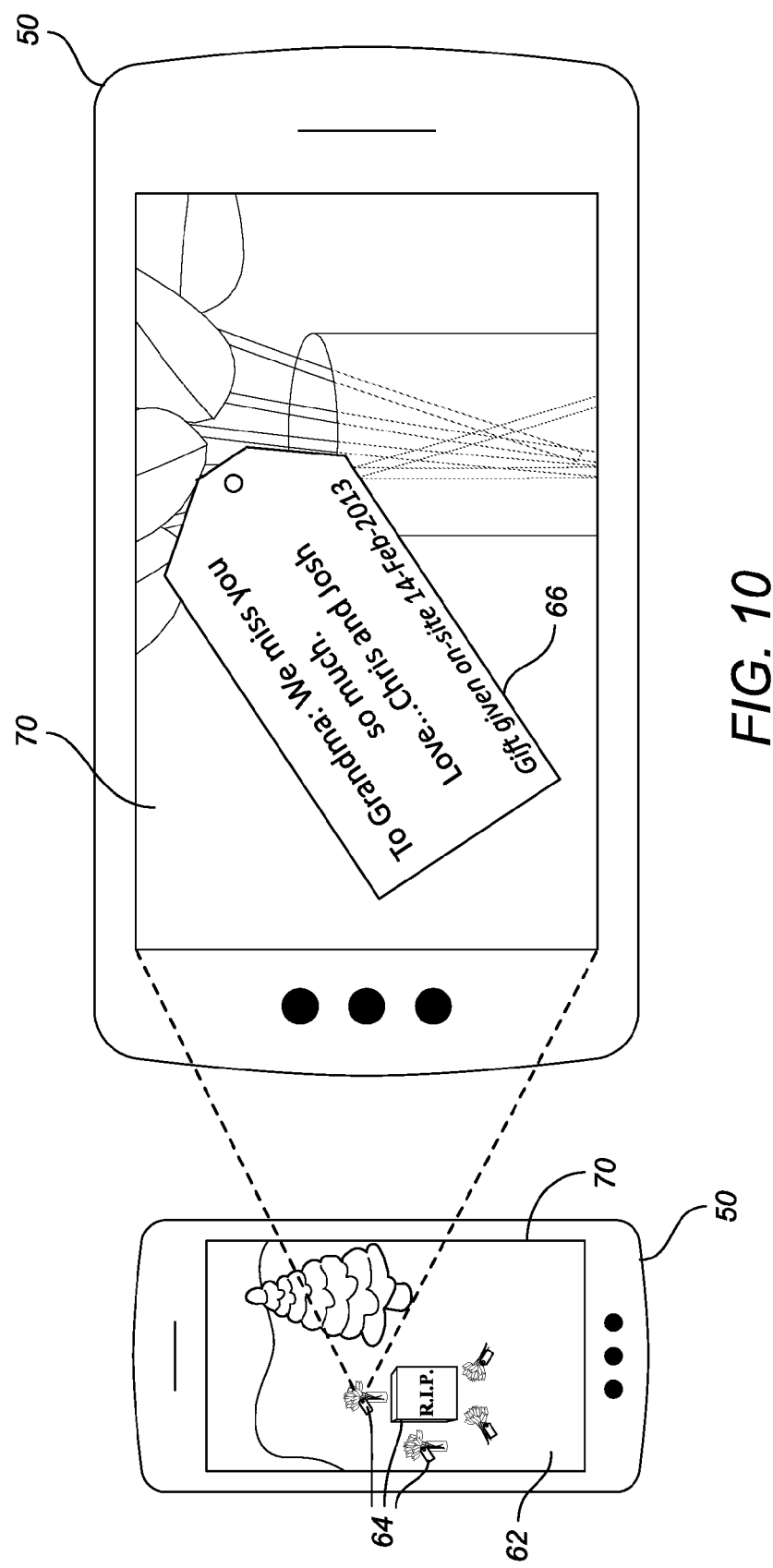
FIG. 10 is a simplified top view of a mobile device and an enlarged top view of a detail shown on the mobile device illustrating augmented reality for a virtual gravestone and accessories.

As illustrated in FIG. 10, a visitor may zoom into an item on augmented reality view 62 to see more details. For example, user interface 70 may display details of who left an item such as on a tag 66 with visitor information. Donations to non-profit or philanthropic causes in the memory of the deceased could also be left in the virtual space and could be done anonymously or with an attribution that could be seen by later visitors to the virtual grave (either through the mobile application "on site" or through the website).

In some embodiments, the augmented reality view, such as live video feed with digital artifacts placed on top of the "real" display, could also be used as a method to lead users to the exact location of the plot.

Figure 13:
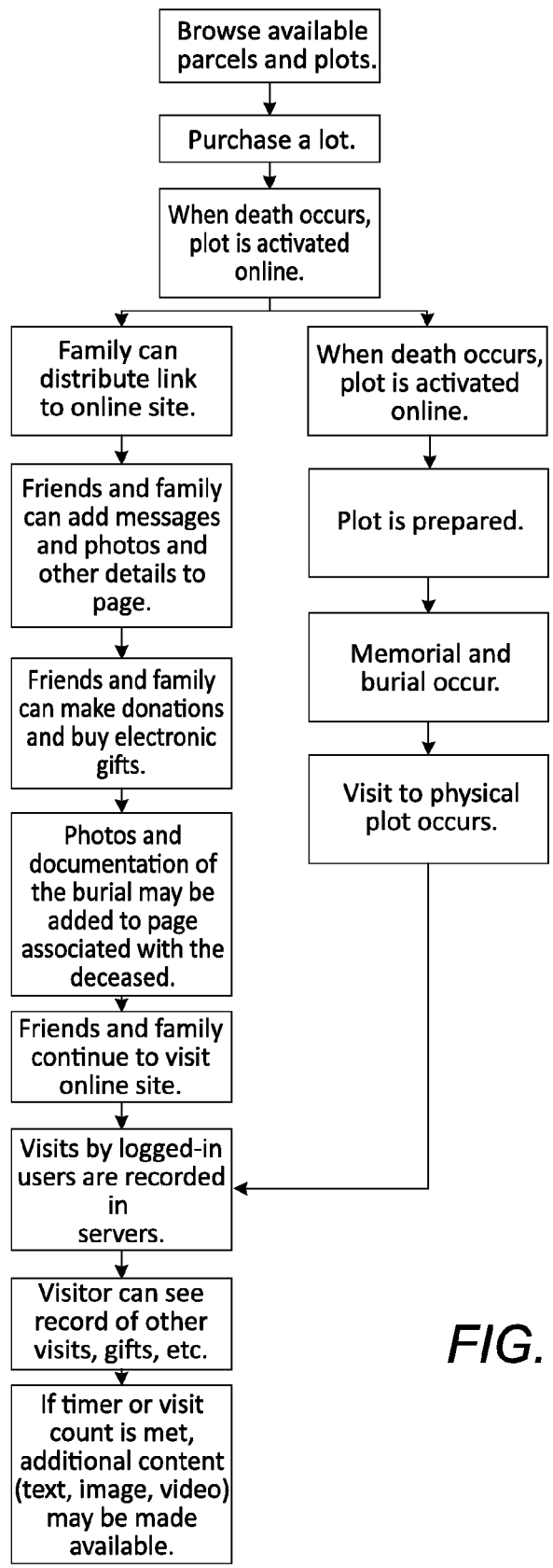
FIG. 13 is flow chart illustrating a typical timeline according to the disclosed methods.

FIG. 13 provides an overview of a sequence of steps associated with an example method of interring the cremated remains of deceased subjects within a parcel of land as described above.

The inventive subject matter offers several advantages over the traditional interment of remains and expands the way in which traditional interment occurs in several ways. For example, the inventive subject matter allows families to use non-permanent interment as a means of having a dead body may be lain to rest in a few different ways. The inventive subject matter allows ceremony and formality similar to traditional burial style interment, yet without the cost associated therewith. The family can hold a graveside service, drop dirt in after the remains or cremains are deposited, and know exactly where the remains are located for many years. For tens of years, a generation or two of family members and loved ones can visit the location the same way a person might visit a grave at a cemetery and bring flowers, or deposit digital flowers at the location. Parties can find the location of the interment through a website, web application or mobile device using various location technologies such as GPS, and pinpoint the location using local technology such as RFID or other location technology to isolate the location.

Where a traditional cemetery desires to have no gravemarkers, the system can be used to take open space where many remains are interred, and have no obstacles for maintenance. A graveyard may have a section with no gravestones, but where the virtual gravestones appear to users who visit the cemetery.

The technology used to identify the location can also trigger interaction with the user through a mobile device, in this way, interacting with the location at the will of the deceased or the loved ones. A consumer who has arranged for his own interment can have pre-recorded messages, video, images, and data that is displayed upon triggering events, such as a date, special day, or upon the appearance of a specific loved one at the interment location. A message can be displayed to any party who merely goes to the location of the interment as well, in this way acting as a virtual gravestone. The virtual gravestone can be displayed in augmented reality. The use of augmented reality allows a user to use a mobile device with a camera or viewer to see the actual location that they are viewing in real time, together with augmentations, such as a sign, a grave stone, additional images overlaid on the real view, and messages. If a family member has placed digital flowers at the graveside, they can be displayed in augmented reality so that others can view the flowers left by others, and perhaps, click to see who and when the digital flowers were left, or "like" the flowers or otherwise post the digital message or flowers to social media or other websites.

The virtual gravestone may be something that allows interaction without being at the plot or interment site, to enable those who are unable to be physically present to interact with the same data.

In some embodiments, the system may interact with existing social media or other web sites through software interface protocols.

In some embodiments, an administrative panel may give parties the power to control what can be done with the digital interaction with the location. For example, a consumer can set up the options prior to death and limit what can be done by others after death, or leave it to the loved ones to control the interactions. A consumer may wish to allow visitors to interact with the digital gravestone in a way that allows them to donate to a cause, or read poems.

In further embodiments, an operator or administrator of the digital environment can choose to sell digital products to the consumers who use the software, or to charge a fee to leave digital gifts and flowers, and even to donate a portion of such fees to a charity or other cause at the discretion of the decedent, the family or the operator. Thus, there is an opportunity for the operator to profit from the management of an ongoing system for managing the locations of the interred remains, and allows for the parties involved to also provide means for donations to causes or even revenue sharing with either or both of the decedent and family or the land owner.

The inventive subject matter also opens new opportunities for mortuaries. Mortuaries are service providers who are losing many additional services when a consumer simply uses them for a memorial service and then retains the cremains thereafter. The inventive subject matter provides an opportunity for the mortuary to sell its memorial services, facilitate alternatives to traditional burial for a fee. The mortuary can offer the software envisioned in the disclosed inventions as a tool for selling the service, and even upsell products, such as digital flowers, enhanced technology, and the like.

The various embodiments described above are provided by way of illustration only and should not be construed to limit the claims attached hereto. Those skilled in the art will readily recognize various modifications and changes that could be made without following the example embodiments and applications illustrated and described herein, and without departing from the true spirit and scope of the following claims.

What is claimed is:

1. A system for transmitting audio and/or visual data about a deceased subject whom has been interred at a defined location comprising:
   a.) an electronic database that stores audio and/or visual data about the subject;
   b.) a computer device configured to receive the audio and/or visual data from the electronic database when the computer device is positioned at the interment location, such that a first user can listen and/or view said data;
   c) and wherein the interred remains are geolocated by a Global Positioning System (GPS) and the computer device is a GPS enabled device configured to geolocate the interred remains.

2. The system of claim 1, wherein the computer device is configured to allow the first user to transmit audio and/or visual data into the electronic database.

3. The system of claim 1, wherein the computer device is also configured to also receive audio and/or visual data when the computer device is located remotely from the interred location such that the first user can also listen or view data at a site remote from the interred location.

4. The system of claim 2, wherein the user transmitted audio and/or visual data is authorized by the first user to be heard or viewed by a different, second user on a computer device.

5. The system of claim 1, wherein the audio and/or visual data stored on the electronic database is authorized to only be unlocked and received by the first user.

6. The system of claim 1, wherein the audio and/or visual data stored in the electronic database is authorized to only be unlocked and received on a computer device at or after a certain date and/or time.

7. The system of claim 1, wherein the audio and/or visual data is selected from the group consisting of: text, digital images, digital video, voice recordings, music, 3D images, 3D video, words, characters, emojis, art, and holograms.

8. The system of claim 2, wherein the audio and/or visual data transmitted from the first user is selected from the group consisting of: text, digital images, digital video, voice recordings, music, 3D images, 3D video, words, characters, emojis, art, and holograms.

9. The system of claim 1, wherein the geolocation of the interred remains is stored on the electronic database.

10. The system of claim 1, wherein the interred remains comprise a Radio-Frequency Identification (RFID) device having a unique predetermined RFID and the computer device is configured to recognize said RFID.

11. The system of claim 1, wherein the computer device displays a grave marker on the computer device of the first user.

12. The system of claim 11, wherein the first user can add audio and/or visual data to the virtual grave marker.

13. The system of claim 12, wherein the audio and/or visual data added by the first user is selected from the group consisting of: text, digital images, digital video, voice recordings, music, 3D images, 3D video, words, characters, emojis, art, virtual flowers, virtual wreaths, virtual flags, and holograms.

14. The system of claim 12, wherein the audio and/or visual data added by the first user can be heard or viewed by a second, different user.

15. A method for transmitting audio and/or visual data about a deceased subject whom has been interred at a defined location to a first user comprising:
   a) geolocating the location of the interred subject by a Global Positioning System (GPS);
   b) storing audio and/or visual data about the subject in an electronic database;
   c) providing a GPS enabled computer device configured to geolocated the interred subject and receiving the audio and/or visual data from the electronic database through the computer device when the computer device is positioned at the interment location; and
   d) listening and/or viewing said data by said first user.

16. The method of claim 15, wherein the computer device is also configured to receive audio and/or visual data when the computer device is located remotely from the interred location such that the first user can also listen or view data at a site remote from the interred location.

17. The method of claim 15, wherein the computer device is configured to allow the first user to transmit audio and/or visual data into the electronic database.

18. The method of claim 17, wherein the user transmitted audio and/or visual data transmitted from the first user is authorized by the first user to be heard or viewed by a different, second user on a computer device.

19. The method of claim 15, wherein the audio and/or visual data is selected from the group consisting of: text, digital images, digital video, voice recordings, music, 3D images, 3D video, words, characters, emojis, art, and holograms.

* * * * *